(12) United States Patent
Nilsson et al.

(10) Patent No.: US 12,538,860 B2
(45) Date of Patent: Feb. 3, 2026

(54) OPTIMAL PATH PLANNING FOR AN AGRICULTURAL VEHICLE

(71) Applicant: AGCO International GmbH, Neuhausen (CH)

(72) Inventors: René Søndergaard Nilsson, Randers (DK); Kun Zhou, Randers (DK); Kenneth Guldbrandt Lausdahl, Randers (DK)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 18/727,422

(22) PCT Filed: Jan. 9, 2023

(86) PCT No.: PCT/IB2023/050169
§ 371 (c)(1),
(2) Date: Jul. 9, 2024

(87) PCT Pub. No.: WO2023/161730
PCT Pub. Date: Aug. 31, 2023

(65) Prior Publication Data
US 2025/0081873 A1    Mar. 13, 2025

(30) Foreign Application Priority Data
Feb. 23, 2022  (GB) ..................... 2202445

(51) Int. Cl.
*A01B 69/04*    (2006.01)
*G05D 1/644*    (2024.01)
(Continued)

(52) U.S. Cl.
CPC .......... *A01B 69/008* (2013.01); *G05D 1/644* (2024.01); *G05D 1/648* (2024.01); *G05D 2105/15* (2024.01); *G05D 2107/21* (2024.01)

(58) Field of Classification Search
CPC ...... A01B 69/008; G05D 1/644; G05D 1/648; G05D 2105/15; G05D 2107/21
(Continued)

(56) References Cited

U.S. PATENT DOCUMENTS 10,194,575 B2    2/2019  Schmidt
12,414,491 B2 *  9/2025  Kertai .................... G05D 1/695
(Continued)

FOREIGN PATENT DOCUMENTS

JP    2020086875 A    6/2020

OTHER PUBLICATIONS

Liu et al., A Vector Line Simplification Algorithm Based on the Douglas-Peucker Algorithm, Monotonic Chains and Dichotomy, Apr. 17, 2020, Geo-Information Technology and Its Applications, ISPRS Int. J. Geo-Inf. 2020, 9, 251; doi: 10.3390/ijgi9040251, pp. 1-14.*

(Continued)

*Primary Examiner* — Andrew R Dyer

(57) ABSTRACT

Systems and methods are provided for planning an agricultural operation for an agricultural machine in a working environment. This Includes determining a boundary for the working environment; determining a plurality of boundary segments for the boundary; and determining, for each of the boundary segments, a candidate operational path. A performance metric associated with the determined operational path for the boundary segment is used to select a primary boundary segment which is optimized for a given metric of the operation. Operational components associated with the agricultural machine can then be controlled based on the determined operational path, e.g. to guide the machine along the path or present the path to an operator.

16 Claims, 6 Drawing Sheets

(51) Int. Cl.
  *G05D 1/648* (2024.01)
  *G05D 105/15* (2024.01)
  *G05D 107/20* (2024.01)

(58) Field of Classification Search
  USPC .......................................................... 701/25
  See application file for complete search history.

(56) References Cited

U.S. PATENT DOCUMENTS

| | | | |
|---|---|---|---|
| 2008/0020846 | A1 | 1/2008 | Vasquez et al. |
| 2015/0285647 | A1 | 10/2015 | Meyer zu Helligen et al. |
| 2017/0300064 | A1 | 10/2017 | Wolters et al. |
| 2018/0232674 | A1* | 8/2018 | Bilde ...................... G06Q 10/06 |
| 2018/0359905 | A1* | 12/2018 | Foster .................. G05D 1/0219 |
| 2018/0359908 | A1* | 12/2018 | Kelley ................. G05D 1/0274 |
| 2019/0208695 | A1* | 7/2019 | Graf Plessen ....... A01B 69/008 |
| 2019/0343035 | A1* | 11/2019 | Smith .................. A01B 69/004 |
| 2020/0296878 | A1* | 9/2020 | Dix ...................... A01B 69/008 |
| 2021/0003416 | A1* | 1/2021 | Wilson ................. A01B 69/008 |
| 2021/0333795 | A1* | 10/2021 | Fitch ........................ G05D 1/644 |
| 2021/0405644 | A1* | 12/2021 | Berridge .............. G05D 1/0223 |
| 2023/0000004 | A1* | 1/2023 | Schaefer .............. A01B 69/008 |
| 2023/0065712 | A1* | 3/2023 | Liu ........................ G05D 1/223 |

OTHER PUBLICATIONS

UK Intellectual Property Office, Search Report for related UK Application No. GB2202445.9, dated Aug. 24, 2022, 4 pages.

European Patent Office, Search Report for related PCT Application No. PCT/IB2023/050169, dated Apr. 14, 2023, 13 pages.

Rik Bähnemann et al: "Revisiting Boustrophedon Coverage Path Planning as a Generalized Traveling Salesman Problem", arxiv.org, Cornell University Library, 201, Olin Library Cornell University Ithaca, NY, 14853 Jul. 22, 2019 (Jul. 22, 2019), XP081998993, DOI: 10.1007/978-981-15-9460-1_20.

* cited by examiner (a) original field boundary (b) simplified field boundary (c) extracted segments (d) rows parallel to segment 5

(e) Ideal row orientation that parallel to one side of field boundary

OPTIMAL PATH PLANNING FOR AN AGRICULTURAL VEHICLE

CROSS-REFERENCE TO RELATED APPLICATIONS

This application is a national phase entry under 35 U.S.C. § 371 of International Patent Application PCT/IB2023/050169, filed Jan. 9, 2023, designating the United States of America and published in English as International Patent Publication WO 2023/161730 A1 on Aug. 31, 2023, which claims the benefit of the filing date of U. K. Patent Application 2202445.9, "Operational Path Planning," filed Feb. 23, 2022, the entire disclosure of which is incorporated herein by reference.

FIELD

Embodiments of the present disclosure relate generally to systems and methods for determining an operational path for an agricultural machine in a working environment.

BACKGROUND

It is known to perform path planning for agricultural operations in a working environment, such as a field or the like. This is often performed manually by the operator of machines working in the environment in an attempt to optimize the relevant agricultural operation in terms of efficiency and cost. More recently, systems are provided which may suggest operational paths to an operator based on the operational task, location of crop, field slope etc. however no complete solution has been provided.

It would be advantageous to provide a system (and associated method) which overcomes or at least partly mitigates one or more problems associated with the prior art systems.

BRIEF SUMMARY

In an aspect of the invention there is provided a control system for planning an agricultural operation for an agricultural machine in a working environment, the control system comprising one or more controllers, and being configured to: determine a boundary for the working environment; determine a plurality of boundary segments for the boundary; determine, for each of the boundary segments, a candidate operational path; determine, for each boundary segment, a performance metric associated with the candidate operational paths; select a primary boundary segment from the plurality of boundary segments in dependence on the determined performance metrics; and generate and output a control signal for controlling one or more operational components associated with the agricultural machine in dependence on the operational path for the primary boundary segment.

Advantageously, the system utilises the boundary to define a plurality of candidate operational paths and choses therefrom a primary path based on a chosen performance metric. This may enable selection of a more efficient operational path in terms of time taken to perform the agricultural operation, distance travelled in performing the operation and/or impact of performing the operation on the working environment, for example.

The one or more controllers may collectively comprise an input (e.g. an electronic input) for receiving one or more input signals. The one or more input signals may comprise data indicative of the boundary of the working environment. The one or more controllers may collectively comprise one or more processors (e.g. electronic processors) operable to execute computer readable instructions for controlling operational of the control system, for example, to determine the boundary and/or the boundary segments, and/or select the primary boundary segment following analysis of the candidate operational paths. The one or more processors may be operable to generate one or more control signals for controlling operation of the one or more operational components. The one or more controllers may collectively comprise an output (e.g. an electronic output) for outputting the one or more control signals.

The boundary for the working environment may be determined from boundary data retrieved from a memory accessible by the control system. The memory may be a remote memory such as a remote server, or the like. The control system may utilise a positioning system and for determining a location of the agricultural machine, and optionally may utilise the location of the agricultural machine in determining the boundary for the working environment, e.g. by determining in the first instance the working environment of the machine, and subsequently the boundary thereof.

The boundary for the working environment may be determined from mapped data of the working environment. The mapped data may be generated automatically. In embodiments, the control system may be configured to receive an operator input defining, at least in part, the boundary for the working environment.

The boundary for the working environment may be defined by an edge of the working environment, by one or more obstacles, by one or more regions of the working environment which are not traversable by the agricultural machine, or any combination thereof.

The boundary for the working environment may be determined as a boundary polygon defined by a plurality of points. The plurality of points may be automatically defined, e.g. through use of a shape fitting algorithm or the like based on mapped data for the working environment, and/or through receipt of an operator input defining at least part of the boundary.

The control system may be configured to determine the plurality of boundary segments in dependence on the points of the polygon. The control system may be configured to determine a subset of points for the boundary polygon defining a simplified boundary polygon for the working environment. The control system may be configured to determine the boundary segments in dependence on the subset of points and/or the simplified boundary polygon, The control system may be configured to apply a curve simplification algorithm for the points of the boundary polygon to determine the subset of points of the simplified boundary polygon. The simplification algorithm may comprise a Ramer-Douglas-Peucker algorithm.

The control system may be configured to define a maximal separation distance between the boundary for the working environment and the determined boundary segments. The maximal separation distance may be predefined, may be user-definable and/or be dependent on an operational characteristic of the associated agricultural machine, e.g. Including one or more of a working width of the machine, a turning radius for the machine, or the like.

The boundary segments may be determined through comparison of a change in heading between paths associated with consecutive points of the field boundary polygon and/or the simplified boundary polygon with a threshold turning angle. This may include the heading of a path between adjacent points of the polygon and the difference between that heading and the heading of the path associated with the preceding pair of points of the polygon. The control system may be configured to determine a boundary segment as encompassing each of the consecutive points of the field boundary polygon and/or simplified boundary polygon associated with a determined change in heading which is less than the threshold turning angle. The control system may be configured to define an endpoint for a boundary segment at a point of the polygon associated with a change in heading which exceeds the threshold turning angle.

Additionally or alternatively, the control system may be configured to determine a subset of boundary segments. The control system may be configured to determine the performance metric for the boundary segments of the determined subset. The control system may be configured to determine the subset of boundary segments from the set of boundary segments determined for the simplified boundary polygon.

The control system may be configured to determine a length for each of the boundary segments. The length of each of the boundary segments may be compared with a threshold length. The control system may be configured to determine the subset of boundary segments in dependence on the comparison.

The control system may be configured, for each boundary segment, to identify each of the points defining the original field boundary polygon corresponding to the boundary segment and to determine a distance between each of those points and the boundary segment. The distance may comprise a perpendicular distance between the boundary segment and each of the points. The control system may be configured to position the boundary segment in relation to a mapped working environment in dependence on this distance. For example, the control system may be configured to move the boundary segments (with respect to the mapped working environment) to a position corresponding to the outermost point of the field boundary polygon used to define the relevant boundary segment. Outermost here may be interpreted with respect to the working environment itself.

In embodiments the control system may be configured to determine a candidate operational path in dependence on a heading parameter for each of the boundary segments. For example, the operational path may comprise a set of rows substantially parallel to the heading of the boundary segment, and optionally extending across the working environment. The heading may be a global heading or a heading determined with respect to a local coordinate system associated with the working environment.

The performance metric may comprise a measure of the number of rows of each candidate operational path. The performance metric may comprise a measure of an overlap of the operational path, which may include a count of the number of overlaps in the candidate operational paths and/or an area of overlap in the candidate operational paths. The performance metric may comprise a measure of soil compaction associated with the candidate operational paths.

The control system may be configured to determine the primary boundary segment, and hence the operational path for the machine, in dependence on a comparison of the performance metrics determined for each boundary segment. For instance, where the performance metric comprises a number of rows, the control system may be configured to determine the primary boundary segment as the boundary segment corresponding to the operational path comprising the fewest number of rows. Where the performance metric comprises a measure of overlap in the operational path, the control system may be configured to determine the primary boundary segment as the boundary segment corresponding to the operational path comprising the fewest number of overlaps and/or the smallest overlap area. Where the performance metric comprises a measure of soil compaction, the control system may be configured to determine the primary boundary segment as the boundary segment corresponding to the operational path determined to have the lowest soil compaction impact.

The control system may be configured to determine the primary boundary segment in dependence on a plurality of performance metrics. For example, in embodiments the control system may be configured to determine the primary boundary segment in dependence on a cost function combining two or more performance metrics.

The field boundary segments may be defined as a straight line, or a curved line as appropriate and in dependence on an appropriate selection of threshold(s) utilised in determining the field boundary segments. In the same manner, the operational path determined therefrom may comprise a set of straight waylines, or may comprise a set of curved waylines or a combination thereof.

The control system may be configured to present the operational path associated with the primary boundary segment to an operator of the agricultural machine. The operational path may be presented on a display screen associated with the machine; and/or on a remote device. For example, the control system may be configured to generate and output control signals for controlling operation of a display screen of the machine to cause presentation of the operational path to an operator of the machine, and/or may be configured to output to a remote device, such as a phone or tablet computer for example, for display thereby of the operational path.

The one or more operational components associated with the agricultural machine may comprise a steering system and/or a propulsion system of the machine for automating motion of the machine along the operational path associated with the primary boundary segment. This may provide a fully or at least partly automated system which may be supervised by an operator of the machine.

A further aspect of the invention provides a guidance system for an agricultural vehicle comprising and/or being controllable by the control system of any preceding aspect.

In another aspect of the invention there is provided an agricultural machine comprising the control system and/or the guidance system of any preceding aspect.

The agricultural machine may comprise a tractor or a harvesting machine. The agricultural machine may comprise a combine harvester or a forage harvester, for example.

A further aspect of the invention provides a method of planning an agricultural operation for an agricultural machine in a working environment, comprising: determining a boundary for the working environment; determining a plurality of boundary segments for the boundary; determining, for each of the boundary segments, a candidate operational path; determining, for each boundary segment, a performance metric associated with the determined candidate operational path for the boundary segment; selecting a primary boundary segment from the plurality of boundary segments in dependence on the determined performance metrics; and controlling one or more operational components associated with the agricultural machine in dependence on the determined operational path for the primary boundary segment.

The method may comprise performing any one or more of the functionalities of the control system described hereinabove.

A further aspect of the invention provides computer software comprising computer readable instructions which, when executed by one or more electronic processors, causes performance of a method in accordance with any aspect described herein.

A yet further aspect of the invention provides a computer readable medium having the computer software of the preceding aspect of the invention stored thereon.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention/disclosure will now be described, by way of example only, with reference to the accompanying drawings, in which.

DETAILED DESCRIPTION

Figure 4:
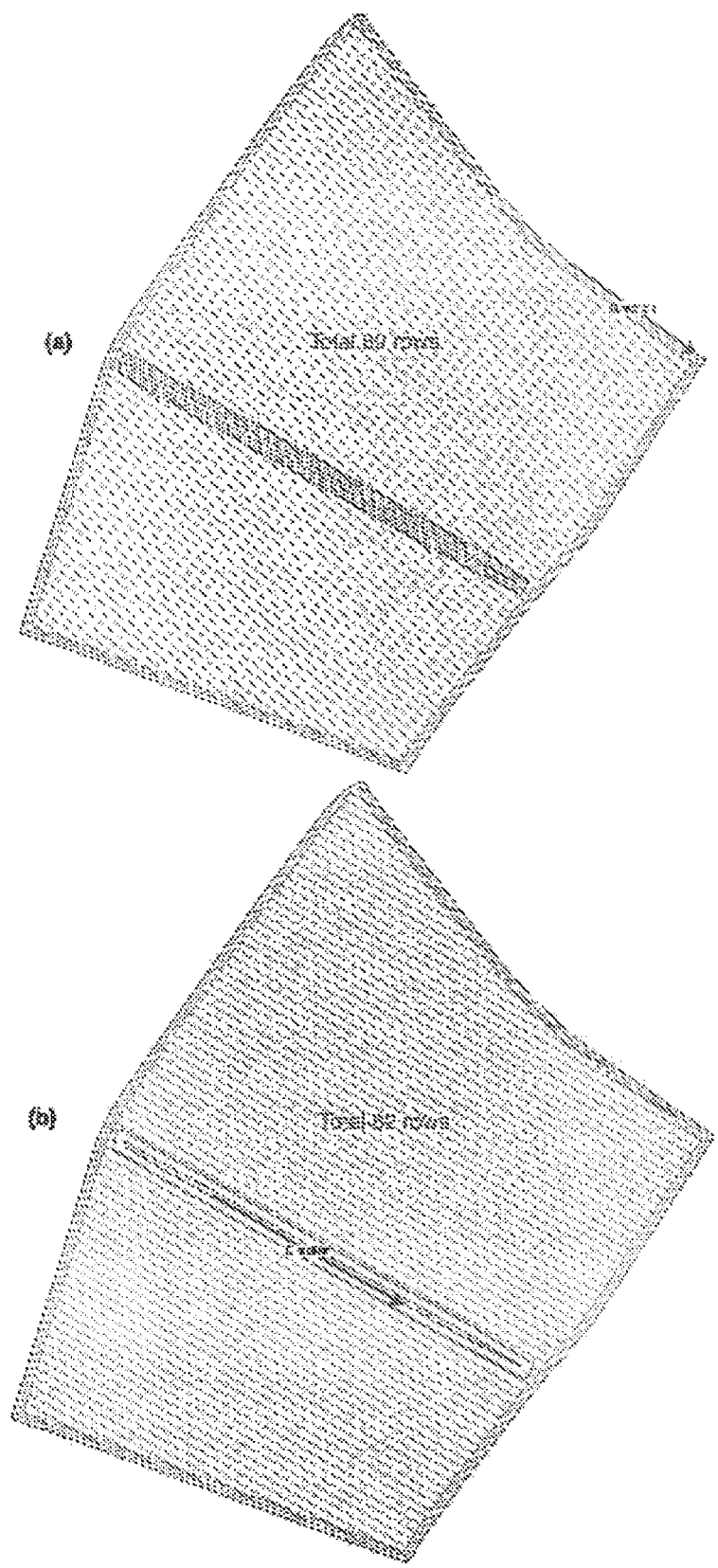
FIGS. 4-9 are a series of schematic views illustrating the operational use of aspects of the present invention.
Figure 5:
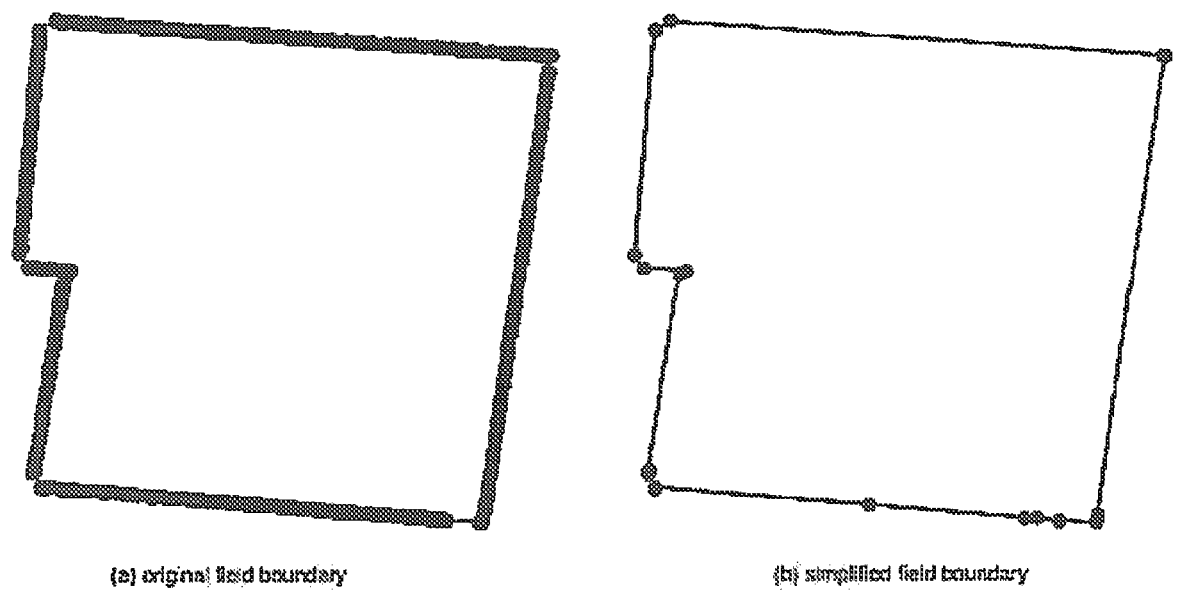

The present invention, in general, relates to systems and methods for planning an agricultural operation in a working environment. As discussed herein, a boundary for the working environment is determined. From this, a plurality of boundary segments for the boundary are identified, and for each of these boundary segments, an operational path is determined, which may for example be dependent on a heading parameter for the boundary segment. A performance metric associated with the determined operational path for the boundary segment is used to select a primary boundary segment which is optimized for a given metric of the operation, such as a measure of the number or rows or the like for increased efficiency for the agricultural operation. This is illustrated figuratively in FIG. 4, which displays how different operational paths for the same working environment may lead to a different number or rows or passes required to cover the entire environment. Specifically, in part a) of the Figure, utilising a first direction for the waylines defining the operational path, a total of 89 rows or passes are required to cover the entire working area. When shifted to a second direction to define the waylines, this reduces the number of passes required to 82, ultimately leading to an increased efficiency of the relevant operation. The direction for the waylines can be determined in the manner described herein. Operational components associated with the agricultural machine can then be controlled based on the determined operational path, e.g. to guide the machine along the path or present the path to an operator.

Control System

As discussed herein, a control system 10 is configured for controlling one or more operational components 32, 35 associated with an agricultural machine 50, such as a combine harvester or tractor or the like. In the illustrated embodiment, the controllable operational components include a guidance system 35 of a harvester 50 for controlling motion of the harvester along a determined operational path, determined in the manner discussed herein, and a user interface 32 associated with the combine harvester 50, e.g. provided as a display terminal of the harvester 50 or indeed a handheld terminal, to provide an indication of the determined operational path for the harvester 50.

Figure 1:
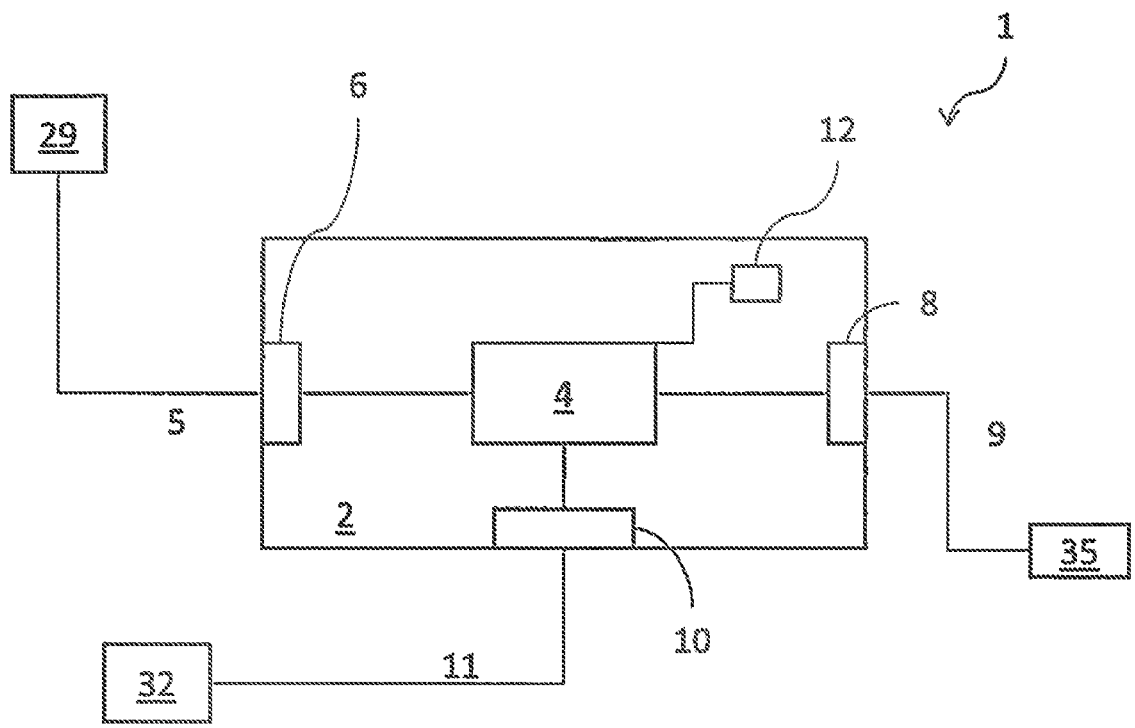
FIG. 1 is a schematic view of a control system.

FIG. 1 illustrates the control system 1 further. As shown, control system 1 comprises a controller 2 having an electronic processor 4, an electronic input 6 and electronic outputs 8, 10. The processor 4 is operable to access a memory 12 of the controller 2 and execute instructions stored therein to perform the steps and functionality of the present invention discussed herein, e.g. by controlling the user interface 32, to indicate, e.g. to an operator of the harvester 50, information indicative of the determined operational path, and/or controlling operation of the harvester 50 through generation and output of one or more control signals to a guidance system 35 thereof.

The processor 4 is operable to receive via input 6 which, in the illustrated embodiment, takes the form of input signals 5 received from a remote server 29, data indicative of a boundary for a working environment for the harvester 50. For instance, the server 29 can have stored therein mapped data of the environment which may, for example, be updated periodically through use of sensing systems on machines operating within that environment or from a mapping system, such as a satellite based mapping system accessible over a data connection. In a variant, the harvester 50 may include one or more sensing systems and the control system 1 may include an electronic input configured to receive sensor data from said systems.

Utilising the data from the server 29, the processor 4 is configured to analyse the data and determine therefrom an operational path for the harvester 50 in dependence on the boundary in the manner discussed herein.

As described above, the controller 2 includes an electronic output 8 configured to output control signals 9 generated by the processor 4 for controlling operation of one or more controllable components associated with the harvester 50. Specifically, processor 4 is operable to generate, and the controller 2 operable to then output via output 8, control signals 9 to a guidance system 35 of the harvester 50 for controlling motion of the harvester 50, e.g. through control over a steering system and/or a propulsion system of the harvester 50, for controlling motion of the harvester 50 along the determined operational path. As will be appreciated, the controller 2 may output the control signals 9 to a local processing unit, e.g. a control unit of the guidance system 35 for controlling operation thereof.

Output 10 is operably coupled to a user interface 32 associated with the harvester 50. As will be appreciated and is discussed herein, the user interface 32 may form part of a portable device, such as a phone or tablet computer, and/or may form part of a display screen within an operator cab of the harvester 50. Here, the control system 1 is operable to control operation of the user interface 32, e.g. through output of control signals 11 in order to display data to an operator of the harvester 50 relating to the operation of the control system 1. Specifically, the control system 1 is operable to control the user interface 32 to display to the operator an indicator of determined operational path, e.g. for the operator to use to then control motion of the harvester 50 along that path, or indeed to monitor automated operation thereof.

System

Figure 2:
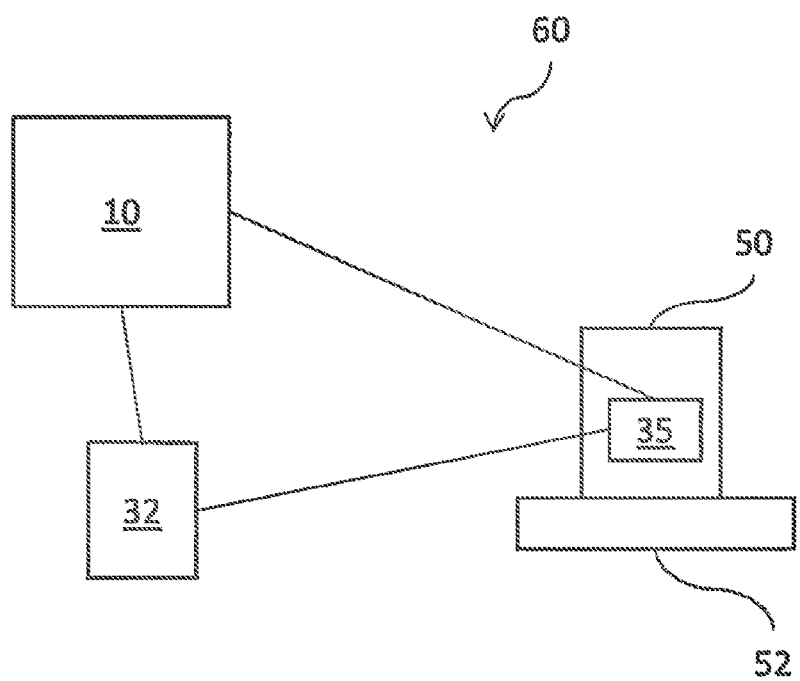
FIG. 2 is a schematic view illustrating aspects of the present invention.

FIG. 2 illustrates a system 60 embodying aspects of the invention. The system 60 comprises a distributed system with control system 1 (discussed hereinabove) shown remote from but in communication with the user interface 32 and harvester 50. In this embodiment, the remote control system 1 may be housed on a remote server or cloud based system and operable to communicate with the user interface 32 and/or harvester 50 over a wireless communication network. In alternative arrangements, the control system 1 may form part of the processing system(s) of the harvester 50 itself. Further, as described herein, the user interface 32 may form part of a display system of the harvester 50.

Method

Figure 3:
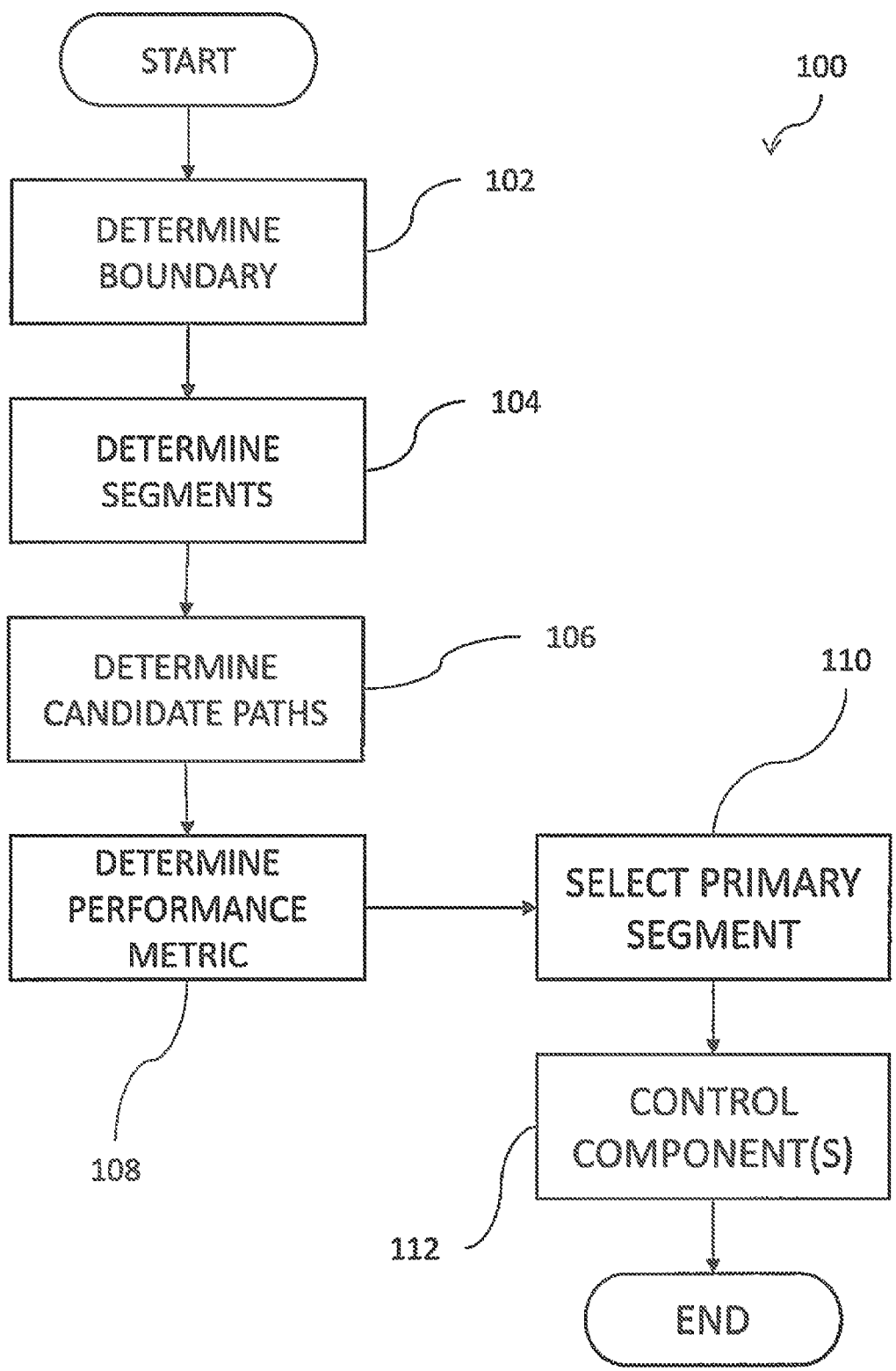
FIG. 3 is a flowchart illustrating an embodiment of a method of the present invention.

FIG. 3 illustrates a method 100 embodying multiple aspects of the present invention, which will be described herein with reference to FIGS. 5-9, also.

In an initial step 102, a boundary for the working environment is determined. As discussed herein, this comprises retrieving boundary data from server 29 and analyzing the boundary data to extract information therefrom. This may include a determination of a shape, size or the like of the boundary, including terrain data such as a measure of a slope associated with the working environment etc.

In step 104, a plurality of boundary segments for the boundary of the working environment are determined. In the illustrated embodiment this involves a number of sub-steps in order to determine the segments.

Firstly, the boundary for the working environment is determined as a boundary polygon defined by a plurality of points. A subset of those points is then selected to define a simplified boundary polygon for the working environment, before ultimately using the simplified boundary polygon and/or the points thereof to determine the boundary segments. Here, a curve simplification algorithm is applied for the points of the boundary polygon to determine the subset of points of the simplified boundary polygon. Here, the curve simplification algorithm comprises a Ramer-Douglas-Peucker algorithm, although other like methods may be equally applicable as will be understood by the skilled reader. This is illustrated figuratively by FIG. 5, where an original field boundary is shown in section a) of the Figure, with a simplified field boundary comprising a subset of the points of the original field boundary is shown in section b) of the Figure.

Figure 6:
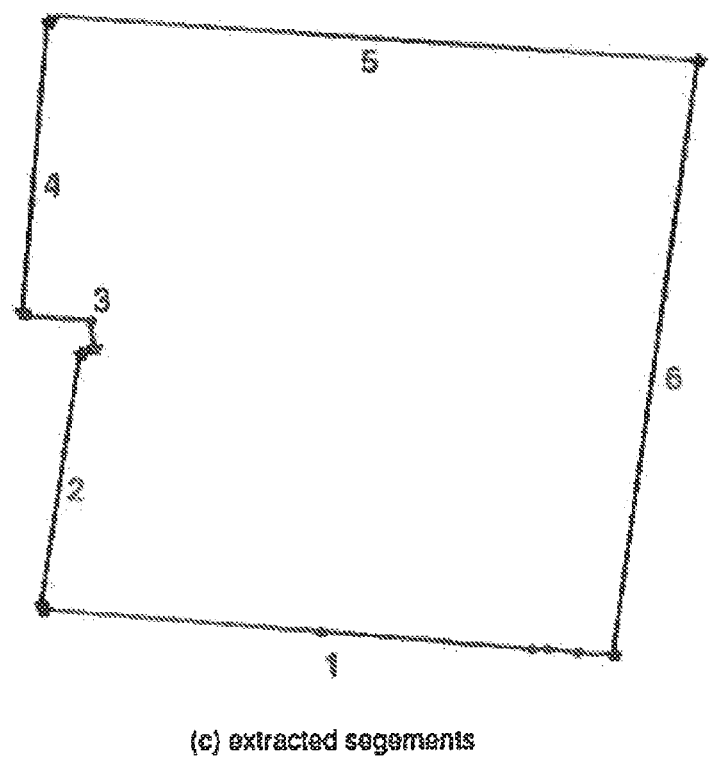

Secondly, candidate boundary segments are extracted from the simplified field boundary based on comparison of a change in heading between paths associated with consecutive points of the simplified field boundary polygon with a threshold turning angle, $\theta$. Specifically, the candidate boundary segments are defined as encompassing each of the consecutive points of the field boundary polygon and/or simplified boundary polygon associated with a determined change in heading which is less than the threshold turning angle. Equally, an endpoint for a candidate boundary segment at a point of the polygon is associated with a change in heading which exceeds the threshold turning angle. Referring to FIG. 6, specifically, a direction segment starts at a point p of the simplified field boundary with turning angle $\theta_p \geq \theta$. As discussed herein, $\theta_p$ is the angle between the two connected sequential paths associated with the points of the simplified field boundary polygon. Each point of the simplified boundary field polygon, and the heading of the paths associated therewith are considered until the condition $\theta_p < \theta$ is no longer satisfied, corresponding to a change in heading which exceeds the threshold turning angle. Then a new direction candidate segment starts and the same procedure repeats until all points of the simplified field boundary polygon are considered. An example of the extracted segments is shown in FIG. 6, where six separate candidate boundary segments are determined utilising this method on the simplified boundary polygon shown in the preceding Figure, and in this example segment "1" consists of six points (two endpoints with 4 points between them).

Figure 7:
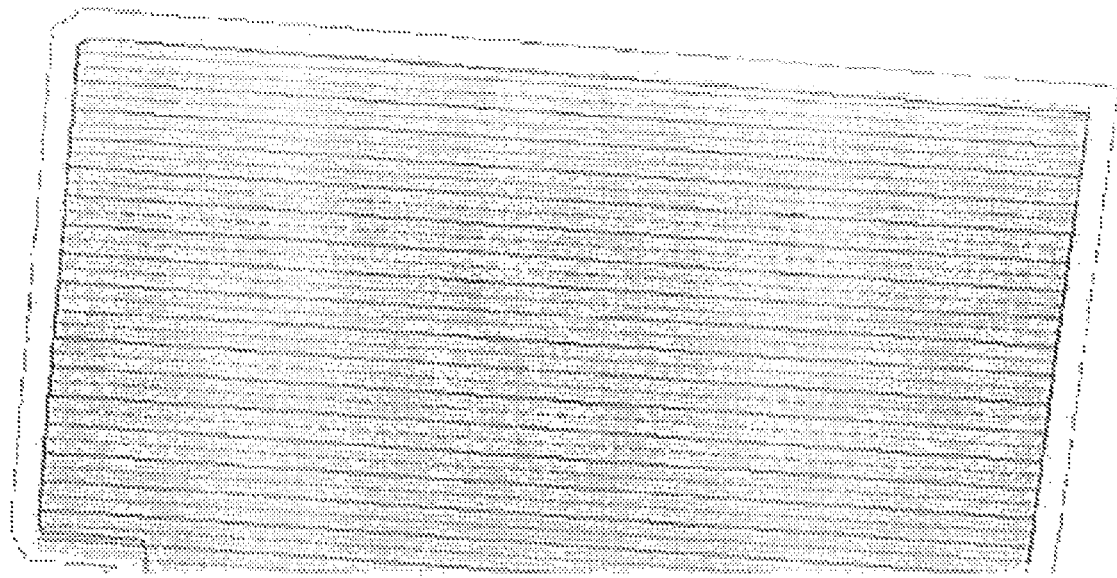
Figure 7:
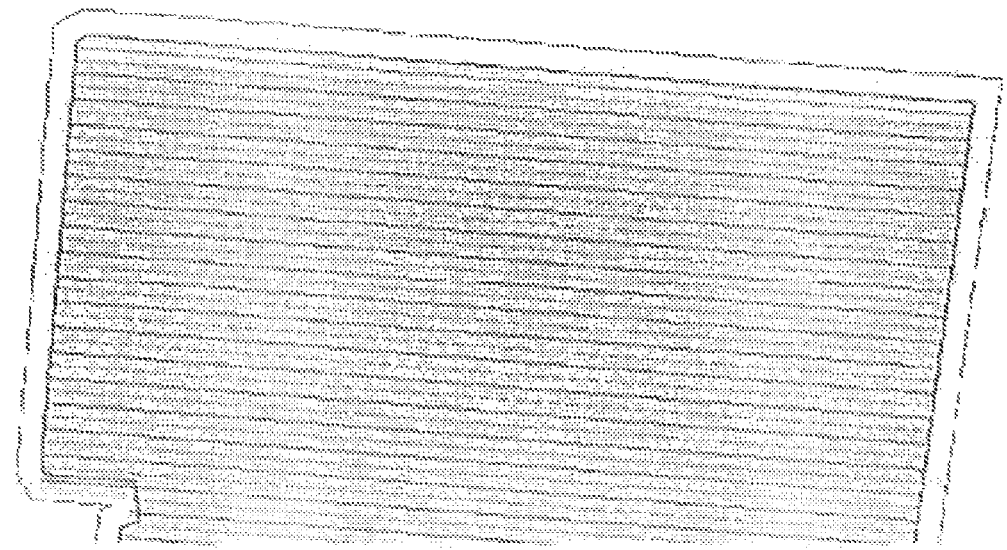
Figure 8:
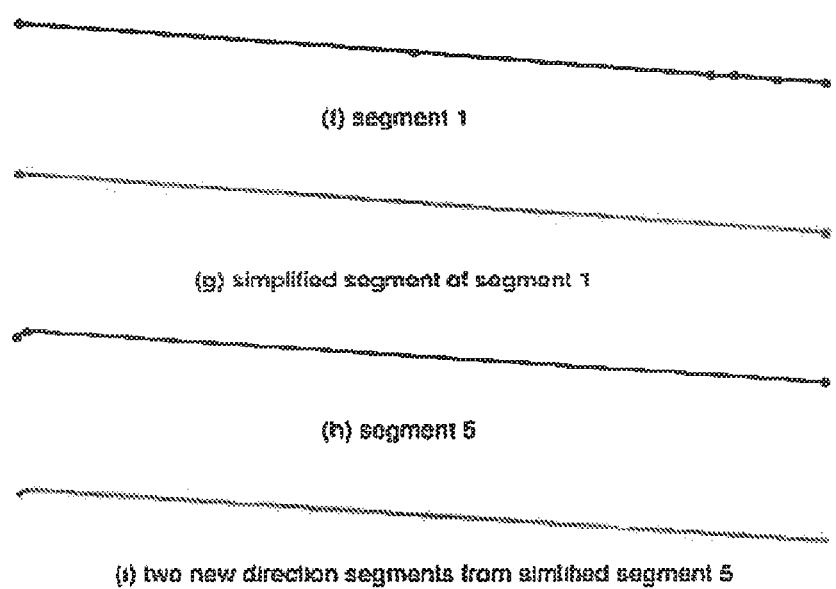
Figure 9:
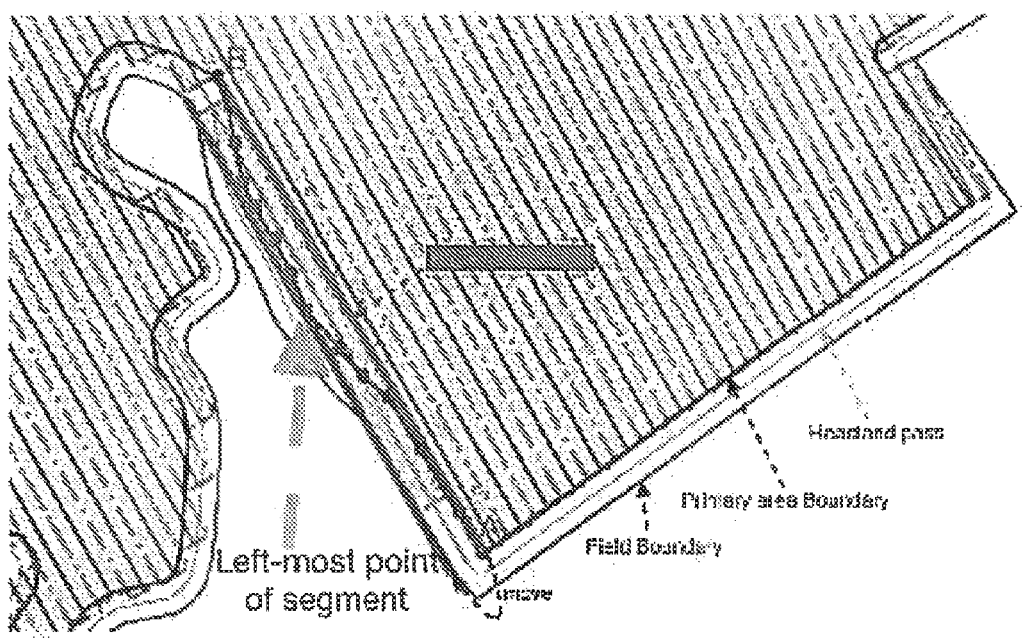

Thirdly, in some instances it may be that candidate boundary segments generated may not be suitable as a wayline direction because, for example, the orientation of the candidate boundary segment is not parallel to one side of the boundary of the working environment. Reference here is made again to FIG. 6, and specifically candidate segment 5, where the direction of the waylines of an operational path determined based on the heading of segment 5 are not parallel to the boundary of the working environment—See FIG. 7. Conversely, the direction of the waylines in part e) of FIG. 7 are parallel to one side of the boundary of the working environment and hence are more practical for the operator of the agricultural machine. To achieve this, the illustrated method includes an additional step where the candidate boundary segments are re-segmented. Specifically, in this example, the Ramer-Douglas-Peucker algorithm is applied again, this time to points of the simplified boundary polygon (or segments thereof) to further simplify each previously generated candidate boundary segment. Taking segment 1 in FIG. 8 as an example, this is further simplified into two points (from six)—section "g" of FIG. 8. New candidate segments are then determined from each pair of consecutive points for the newly generated polygon segment. In this instance, the new polygon segment is formed from two points only, so only a single candidate boundary segment is determined. In contrast, following this method, re-segmentation of the section of the boundary polygon corresponding to segment 5—section h of FIG. 8, results in two new candidate boundary segments.

A further step is then performed to reduce the candidate segment list further, specifically by comparison of the length of each candidate boundary segment with a threshold length. Candidate segments whose length is shorter than a given threshold value are discarded from the candidate segment list. In the example, only the longer of the two new segments generated from previous segment 5 are retained following this step.

Fourthly, each of the remaining candidate boundary segments are further considered to generate the final list of candidate segments for generation of the final operational path for the machine. Specifically, for each boundary segment, each of the points defining the original field boundary polygon and corresponding to the particular candidate boundary segment, and the positions thereof (relative to the candidate boundary segment) are identified. A distance between each of those points and the candidate boundary segment is then used to re-position the candidate boundary segment in relation to a mapped working environment. This is illustrated figuratively in FIG. 9, where each of the points of boundary between A and B of candidate segment AB, and the positions thereof relative to the candidate segment AB, are identified. In the case of straight segment, such as segment AB shown in this Figure, the position of the candidate segment is moved to the left-most point of the boundary polygon points such that the position of the final candidate segment encompasses all of these points—e.g. is positioned at an outermost edge of these points with reference to the working environment.

Referring back to FIG. 3, in step 106, for each of the candidate boundary segments remaining, repositioned or otherwise as discussed hereinabove, a candidate operational path is determined. This comprises generation of a complete field partition based on the heading of the relevant candidate boundary segment. In general, this comprises, for each candidate boundary segment, generating a set of rows substantially parallel to the heading of the boundary segment and extending across the working environment.

In step 108, a performance metric associated with each of the candidate operational paths generated in step 106 is determined. As discussed herein, the performance metric may be any measure of the candidate operational path, and may be chosen so as to optimize the eventual path taken by the agricultural machine performing the operation based on any one of a number of different criteria. In one example, the performance metric may comprise a measure of the number of rows of each candidate operational path. In a further example, the performance metric may comprise a measure of an overlap of the operational path, which may include a count of the number of overlaps in the candidate operational paths and/or an area of overlap in the candidate operational paths. In a yet further example, the performance metric may comprise a measure of soil compaction associated with the candidate operational paths. Any one or more of these performance metrics may be appropriate for a given operational task.

In step 110, a primary boundary segment is selected from the plurality of candidate boundary segments based on an analysis of the determined performance metrics. This analysis is dependent on the chosen metric(s), however by way of an example a comparison of the performance metrics for each boundary segment may be used to select the primary boundary segment. For instance, where the performance metric comprises a number of rows, this may include selecting as a primary boundary segment, the candidate boundary segment corresponding to an operational path comprising the fewest number of rows. Where the performance metric comprises a measure of overlap in the operational path, the primary boundary segment may be selected as the candidate boundary segment corresponding to the operational path comprising the fewest number of overlaps and/or the smallest overlap area. Where the performance metric comprises a measure of soil compaction, the primary boundary segment may be selected as the boundary segment corresponding to the operational path determined to have the lowest soil compaction impact.

Following selection of the primary boundary segment, and the associated operational path, one or more operational components associated with the agricultural machine, e.g. the harvester 50, are controlled accordingly. As discussed herein, this can include controlling operation of a user interface 32 for displaying to an operator the determined operational path. This may be used by the operator to manually control the movement of the harvester 50 along the determined path, or may be used in a supervisory role monitoring operation of the harvester 50, e.g. where the harvester is being operated by another person and/or automated to some extent. In some variants, the method extends to at least partially automating motion of the harvester 50 along the determined operational path. As discussed herein, this may involve controlling a guidance system for the harvester, a steering system of the harvester and/or a propulsion system of the harvester, as will be appreciated.

All references cited herein are incorporated herein in their entireties. If there is a conflict between definitions herein and in an incorporated reference, the definition herein shall control.

What is claimed is:

1. A method of planning an agricultural operation for an agricultural machine in a working environment, the method comprising:

determining a boundary for the working environment as a field boundary polygon defined by a plurality of points;

determining a plurality of boundary segments for the boundary through comparison of a change in heading between paths associated with consecutive points of the plurality of points of the field boundary polygon with a threshold turning angle, determining the plurality of boundary segments further comprising:
  determine a length for each of the boundary segment of plurality of boundary segments;
  compare the determined length of each of the boundary segments of plurality of boundary segments with a threshold length; and
  based at least partially on the comparison, determine a subset of boundary segments;

determine at least one boundary segment of the plurality of boundary segments as encompassing each of the consecutive points of the field boundary polygon associated with a determined change in heading which is less than the threshold turning angle;

determining, for each of the boundary segments, a candidate operational path;

determining, for each boundary segment, a performance metric associated with the candidate operational path for the boundary segment;

selecting a primary boundary segment from the plurality of boundary segments in dependence on the determined performance metrics; and controlling one or more operational components associated with the agricultural machine in dependence on the determined operational path for the primary boundary segment.

2. A control system for planning an agricultural operation for an agricultural machine in a working environment, the control system comprising one or more controllers, and being configured to:

determine a boundary for the working environment as a field boundary polygon defined by a plurality of points;

determine a plurality of boundary segments for the boundary through comparison of a change in heading between paths associated with consecutive points of the plurality of points of the field boundary polygon with a threshold turning angle;

identify, for each of the boundary segments of the plurality of boundary segments, each of the points of the plurality of points defining the field boundary polygon corresponding to the boundary segment;

determine, for each of the boundary segments of the plurality of boundary segments, a distance between the points of the plurality of points corresponding to the boundary segment and the boundary segment; and position the boundary segment in relation to a mapped working environment in dependence on the distance;

determine at least one boundary segment of the plurality of boundary segments as encompassing each of the consecutive points of the field boundary polygon associated with a determined change in heading which is less than the threshold turning angle;

determine, for each of the boundary segments, a candidate operational path;

determine, for each boundary segment, a performance metric associated with the candidate operational paths;

select a primary boundary segment from the plurality of boundary segments in dependence on the determined performance metrics; and generate and output a control signal for controlling one or more operational components associated with the agricultural machine in dependence on the operational path for the primary boundary segment.

3. The control system of claim 2, wherein the boundary for the working environment is determined from mapped data of the working environment; and wherein the mapped data is generated automatically; and wherein the control system is configured to receive an operator input defining, at least in part, the boundary for the working environment.

4. The control system of claim 2, further configured to determine the plurality of boundary segments in dependence on the points of the polygon.

5. The control system of claim 4, further configured to:
determine a subset of points for the boundary polygon defining a simplified boundary polygon for the working environment; and
determine the boundary segments in dependence on at least one of the subset of points or the simplified boundary polygon.

6. The control system of claim 5, further configured to apply a curve simplification algorithm for the points of the boundary polygon to determine the subset of points of the simplified boundary polygon, wherein the simplification algorithm comprises a Ramer-Douglas-Peucker algorithm.

7. The control system of claim 2, further configured to define an endpoint for a boundary segment at a point of the polygon associated with a change in heading which exceeds the threshold turning angle.

8. The control system of claim 2, further configured to:
determine a subset of boundary segments; and
determine the performance metric for the boundary segments of the determined subset.

9. The control system of claim 8, further configured to:
determine a length for each of the boundary segments;
compare the length of each of the boundary segments with a threshold length; and
determine the subset of boundary segments in dependence on the comparison.

10. The control system of claim 2, further configured to determine a candidate operational path in dependence on a heading parameter for each of the boundary segments.

11. The control system of claim 10, wherein the candidate operational path for each boundary segment comprises a set of rows parallel to the heading of the boundary segment, and extending across the working environment.

12. The control system of claim 2, further configured to determine the primary boundary segment in dependence on a comparison of the performance metrics determined for each boundary segment.

13. The control system of claim 2, wherein the performance metric comprises a measure of the number of rows of each candidate operational path; and wherein the control system is configured to determine the primary boundary segment as the boundary segment corresponding to the operational path comprising the fewest number of rows.

14. The control system of claim 2, wherein the performance metric comprises a measure of an overlap of the operational path; and wherein the control system is configured to determine the primary boundary segment as the boundary segment corresponding to the operational path comprising at least one of the fewest number of overlaps or the smallest overlap area.

15. The control system of claim 2, wherein the performance metric comprises a measure of soil compaction associated with the candidate operational paths; and wherein the control system is configured to determine the primary boundary segment as the boundary segment corresponding to the operational path determined to have the lowest soil compaction impact.

16. The control system of claim 2, further configured to present the operational path associated with the primary boundary segment to an operator of the agricultural machine; and wherein the operational path is presented on at least one of: a display screen associated with the machine; or on a remote device.

* * * * *